May 9, 1967 R. L. HALL 3,317,926
SWIMMING POOLS
Filed Oct. 26, 1964 7 Sheets-Sheet 1

INVENTOR.
RAYMOND L. HALL
BY
Ralph R Roberts
AGENT

May 9, 1967 R. L. HALL 3,317,926
SWIMMING POOLS

Filed Oct. 26, 1964 7 Sheets-Sheet 4

INVENTOR.
RAYMOND L. HALL
BY
Ralph R Roberts
AGENT

INVENTOR.
RAYMOND L. HALL
BY
Ralph R Roberts
AGENT

May 9, 1967  R. L. HALL  3,317,926
SWIMMING POOLS
Filed Oct. 26, 1964  7 Sheets-Sheet 6

INVENTOR.
RAYMOND L. HALL
BY
Ralph R Roberts
AGENT

May 9, 1967  R. L. HALL  3,317,926
SWIMMING POOLS

Filed Oct. 26, 1964  7 Sheets-Sheet 7

INVENTOR.
RAYMOND L. HALL
BY
*Ralph R Roberts*
AGENT

United States Patent Office 3,317,926
Patented May 9, 1967

3,317,926
SWIMMING POOLS
Raymond L. Hall, Fairfield, N.J.
(19 Hamilton Court, Whippany, N.J. 07981)
Filed Oct. 26, 1964, Ser. No. 406,228
16 Claims. (Cl. 4—172)

This invention relates to swimming pools and particularly to those which are of a pre-fabricated construction. More particularly this invention relates to a swimming pool of plural unit construction which may be readily assembled at the use site.

Even more particularly this invention relates to a swimming pool whose elements include an assembled templet base providing thereon predetermined mounting pads for vertically disposed supports which in turn carry a deck or walkway and guard railing while simultaneously providing a spaced retaining means for both inner and outer walls.

Swimming pools of assembled construction providing for outdoor permanent or semi-permanent type installation are now becoming popular. Although these prefabricated pools do provide certain economies of material and labor, heretofore they have required a great amount of technical competence and/or training as well as equipment to assemble and prepare for use.

It is an object of this invention to provide a swimming pool of economical construction which may be readily assembled by semi-skilled labor in a fool-proof manner by the following of simple directions and to require only the most elementary tools and equipment. This type of construction is identified with the do-it-yourself articles.

It is a further object of this invention to provide a swimming pool whose assembly and construction comprises a series of assembled module units of prefabricated construction, said pool when assembled being either a permanent or temporary installation at the selection of the owner. This pool also provides for the assembly at the option of the owner to be at or above ground level or to be installed with the top at or near ground level.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate a preferred embodiment and alternate embodiments thereof of the invention, and together with the description, serve to explain the principles of the invention.

In the drawings—in which each reference character is used to indicate the same or like part in the various views.

In the preferred embodiment of this invention the elements and method of assembly contemplate a swimming or bathing pool which may be assembled to sit upon the ground or to be assembled in a scooped-out portion of ground so that a portion of the pool is below ground level and a larger portion of the pool extends above ground forming with the walkway and protective rail, a fenced pool enclosure. It is further contemplated that the elements forming a unitary portion of the pool frame will include a plural quantity of base straps which are cut and drilled for bolting to a like number of base plates to form a predetermined nearly-circular base frame. The ground is leveled so that this base frame will support a pool having a substantially level top. From each base plate there are attached inside and outside post members. Attached at a predetermined height above the base frame are a plural number of platforms or deck assemblies. The outer posts are continued upwards from the deck assemblies and are terminated with a retaining rail. Extending from inside to inside post are inside panels and extending from outside to outside post are outside panels. In the preferred embodiment there is provided a plastic liner which is attached to the inner edge of the deck assemblies.

It will be understood that the foregoing general description and the following detailed description as well are exemplary and explanatory of the invention but are not restrictive thereof.

Referring now in detail to the embodiment of the invention herein shown for purposes of illustration and example, the swimming pool comprises a generally circular structure (FIGS. 1 and 2) in which an inner wall 30 and an outer wall 32 are attached at their base to a base frame providing a templet ring 34. A deck 36 joins the upper ends of the inner and outer walls. In the example illustrated, a plastic liner 38 extends from the inner edge of the deck 36, down the inner wall 30 and thence to the inner wall on the other side of the pool. This liner, as exemplified, lies on the ground 40 which may have a central portion hollowed out to give additional depth to the pool particularly toward the center of the pool. Extending upwardly from the deck 36 and as a continuation of the outer wall 32 is a fence 42 which may have one portion removable and/or hinged so that it can be opened or closed to provide a passageway through the fence portion 42.

Referring now to FIGS. 3, 4, 5, 6, 7 and 8 in particular the templet ring 34, the present embodiment is formed of a plurality of rectangular shaped base bars 44 which are arranged for assembly with their ends overlapped. At this juncture there is also provided a base plate 46 having tapped holes 48 in spaced alignment with holes previously drilled in the ends of base bars 44. The bars 44 are attached to base plate 46 by means of cap screws 50 and when so attached the predrilled bars not only form a templet ring 34 or base frame but when bolted to the base plates 46 provide spaced supports for the upper structure to be described below. It is to be noted, that as reduced to practice, the bars 44 are cut to a predetermined length and are precisely drilled in a jig so that when assembled in the field there is no requirement of pre-assembly testing and the bars will form an easily assembled accurate polygon forming substantially a circle. Extending upwardly from the rectangular platform portion of base plate 46 is rib 52 which, as exemplified, has a molded relief adapted to engage and support post members to be later described. This relief has formed therein upwardly extending shoulders 54 which preferably are of curved configuration and are sloped to accommodate the desired shape of the pool and the exterior wall. A base platform 56 extending outwardly from the shouldered portion has face supporting portions at right angles to the shoulders 54. Bolt holes 58 are provided in the rib 52.

Figure 8:
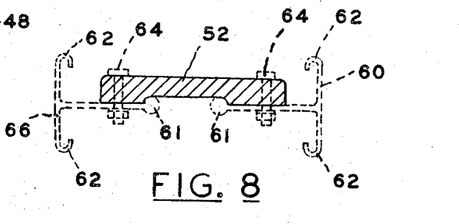
FIG. 8 is a sectional view of the base plate taken on the line 8—8 of FIG. 7 and showing in phantom outline the vertical extrusion members attachable thereto.

An inside post member 60, as reduced to practice, is a T-shaped aluminum extrusion having the end portion of the stem of the T termination in a circular or bulb cross-section 61 (Phantom outline FIG. 8). The cross bar of the T has each end formed into an inwardly directed half-loop 62 to provide a hook or retaining shoulder. When attached to the rib 52 of base plate 46 by means of bolt 64, the inside post 60 is inclined inwardly at a small degree such as five degrees.

Figure 7:
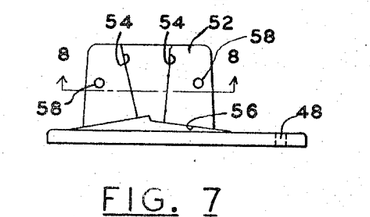
FIG. 7 is a side view of the base plate shown in FIG. 6.

An outer post member 66 is also made from the aluminum extrusion from which post member 60 is cut. This post member 66 has the same cross-sectional configuration as member 60 as seen in FIG. 8, however it is preferable to make member 66 longer than member 60 and to continue this member upwardly for approximately another four feet. This additional post length provides means for supporting the upper fence 42. As reduced to practice and as seen in FIGS. 4 and 7 the base platform section 56 which supports member 66 is inclined outwardly at an angle of approximately twelve degrees.

Figure 3:
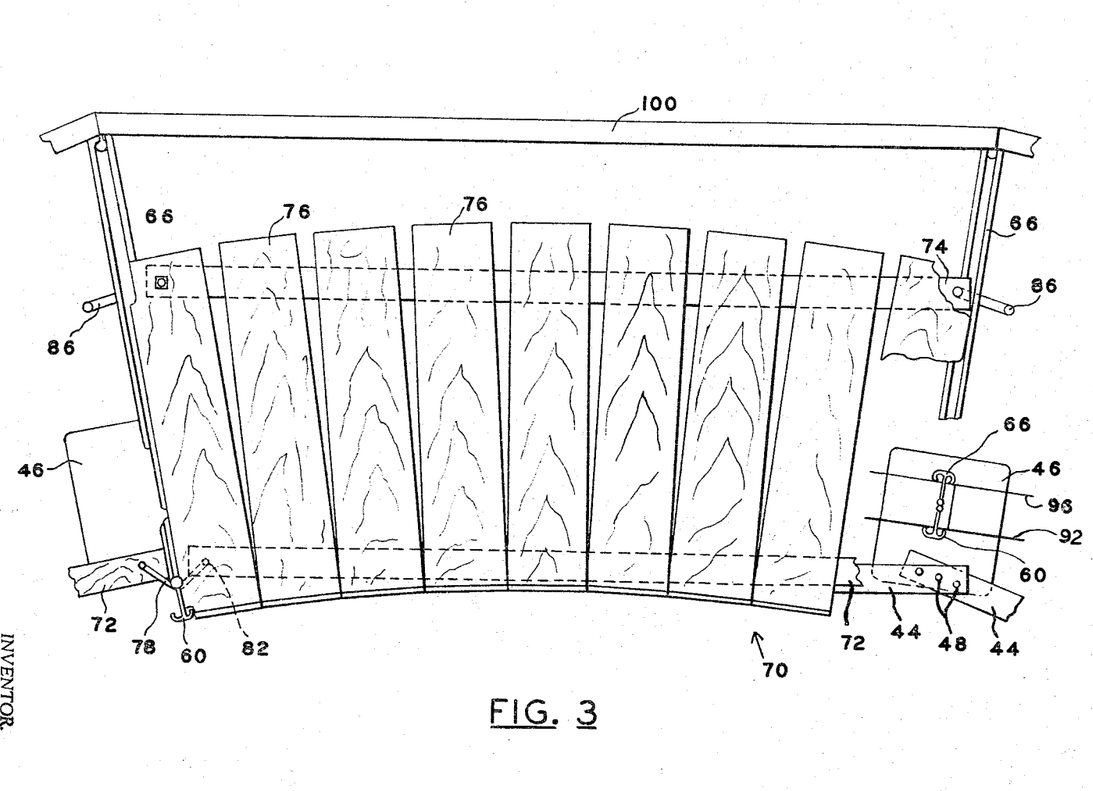
FIG. 3 is an enlarged plan view of a unit of assembly and with certain positions broken away to show other elements below.
Figure 4:
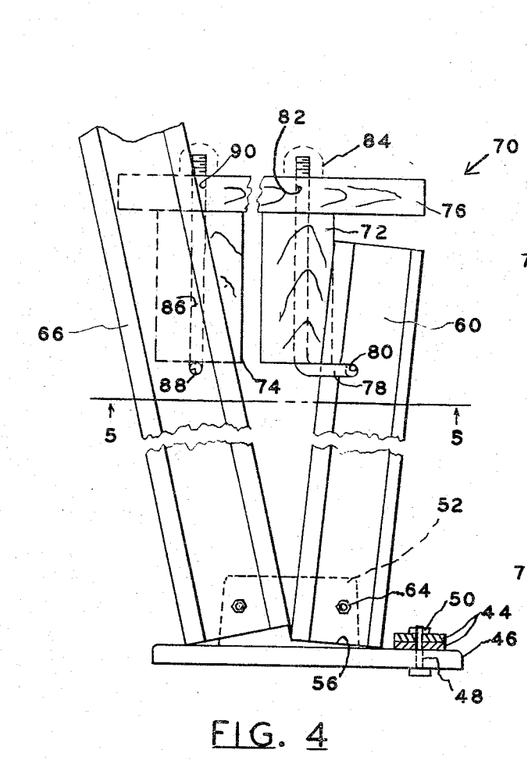
FIG. 4 is a somewhat diagrammatic enlarged side view of the elements comprising the vertical support assembly.
Figures 5, 12:
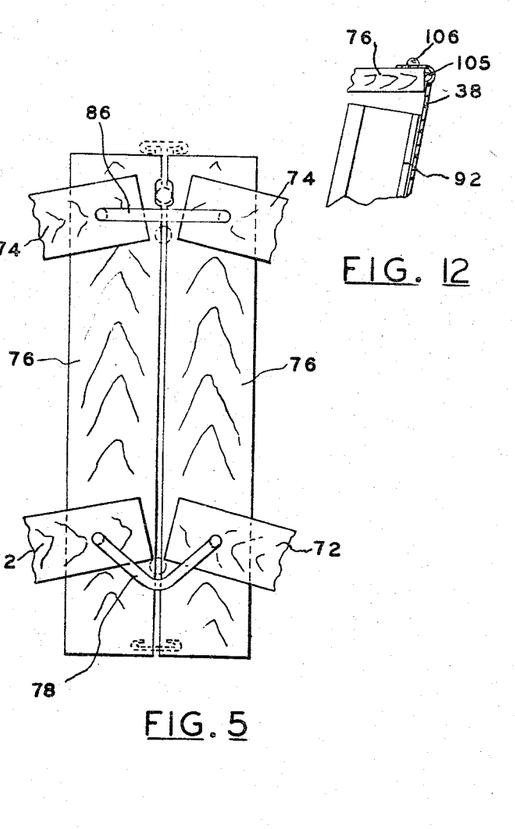
FIG. 5 is a view looking upwardly along the line 5—5 of FIG. 4 and showing the extruded vertical support members in phantom outline.
FIG. 12 is a fragmentary sectional view showing in enlarged scale a method of attaching a plastic liner to the pool structure.
Figure 6:
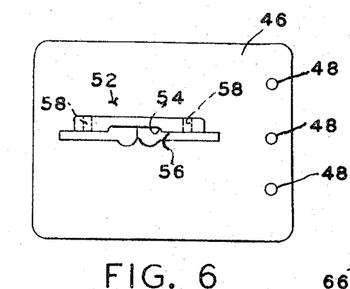
FIG. 6 is a plan view of a base plate forming a part of the support assembly.

At a selected distance above the base plate 46 there is disposed a platform member 70 which as shown in FIGS. 3 and 4 include wooden beam supports made from two by four beams. A front beam 72 is made slightly less in length than the distance between adjacent inside posts 60. A rear beam 74 of slightly longer length is disposed between adjacent outer posts 66 and is preferably at the same height as the front beam 72. A plurality of deck planks 76 extend from the front to rear beams and are attached to these beams by conventional means such as by nailing. The deck or platform member 70 thus formed is removably attached to the inner and outer posts to form a truss member between both adjacent inner posts and adjacent outer posts and also from each inner and outer post members extending upwardly from a common base plate 46. The attaching means, as shown in the preferred embodiment, not only act as supports but also serve to form a circular tension member at the plane of the platform members. As the front beam 72 is preferably a straight beam and as the deck planks 76 are arranged so that their inner edges form an arc, it is seen in FIG. 3 that the end portions of the beam 72 are further from the front edge of deck planks 76 than are the intermediate deck planks. It is desirable that the inside posts 60 be on the same arc as the front edges of the deck planks 76 hence to connect posts 60 to the ends of front beam 72 a bent U-bolt 78 is formed having the intermediate portion bent not only into a portion having two arcs with an intermediate portion therebetween of straight length. This arc portion is bent out of a single plane into a plane at right angles thereto and into a shallow V with an included angle of about one hundred degrees. A hole 80 is made in the web of inside post 60 and a hole 82 of a similar size to accommodate the bolt 78 is made in each end of front beam 72 and through the deck plank 76. Acorn type nuts 84 are turned onto the threaded ends of bolt 78 when it is inserted in the post and the platform 70 is placed thereon. These nuts 84 are then tightened to bring the flat plane of the bent U-bolt into support relationship to the bottom surface of beam 72.

As the ends of the rear beam 74 are nearer the rear edge of the deck planks disposed at the ends of the platform members, a single plane U-bolt 86 suffices to attach the platform member 70 to the outer post 66. This U-bolt 86 has its intermediate portion formed with two arcs and the portion in between is a straight length. A hole 88 is made in the web of the outer post and a hole 90 of a similar size to accommodate the bolt 86 is made in each end of rear beam 74 and through the deck plank 76. Acorn type nuts 84 are turned onto the threaded ends of bolt 86 and are tightened to bring the flat plane of the intermediate straight portion of the U-bolt 86 into support relationship to the bottom surface of beam 74.

When bolted in place the bottom templet ring formed of bars 44 and base plate 46 provides a substantial tension ring. The upwardly extending inside and outside posts 60 and 66 when joined by the cross-beam effect of the platform member 70 provides a substantial truss or column as well as a support deck. The connected series of front beams 72 and rear beams 74 provide not only a support for the deck planks 76 but also both inner and outer tension and compression rings of substantial strength.

Figure 9:
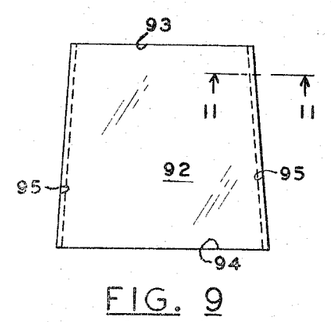
FIG. 9 is a plan view of an inner panel member.
Figure 10:
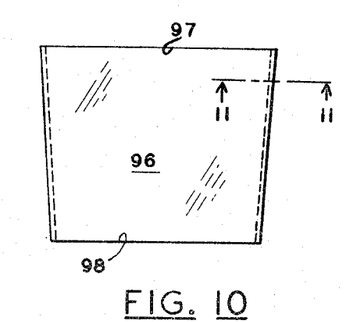
FIG. 10 is a plan view of an outer panel member.
Figure 11:
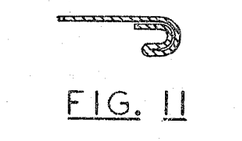
FIG. 11 is a sectional view on the line 11—11 of both FIGS. 9 and 10 and showing the preferred edge engaging lip as formed on the inner and outer panels.

Prior to the assembly of the platform member to the inside posts 60 and the outer posts 66 there are assembled to or mounted on the posts a series of panels. Referring now particularly to FIGS. 8, 9. 10 and 11 it is to be noted that the embodiment described is a present preferred method of construction and that the panels to be hereinafter described could be welded, riveted, bolted or otherwise attached to the posts. As the inside posts are mounted on base plate 46 so as to slope or incline inwardly, the distance is less between adjacent posts 60 at the level of the platform member 70 than is the distance between adjacent posts 60 at the level of the templet ring at the base 46. This difference in distance is accommodated and discerned in an inner panel 92 in which the upper edge 93 is less than the lower edge 94. This inner panel 92 is further distinguished in that the side edges 95 are formed to provide a hook edge as shown in FIG. 11. These edges 95 are formed so as to snugly engage the half-loops 62 provided on post 60.

It is also of note that as the outer posts are mounted on base plate 46 so as to slope or incline outwardly, the distance is greater between adjacent posts 66 at the level of the platform member 70 than is the distance between adjacent posts 66 at the level of the templet ring at base plate 46. This difference in distance is also accommodated and discerned in the construction of an outer panel 96 in which the upper edge 97 is greater than the lower edge 98. This outer panel is also further distinguished in that, as the inner panel, the side edges are formed to provide hook edges as seen in FIG. 11. These edges snugly engage the half-loops 62 provided on post 66.

Figure 14:
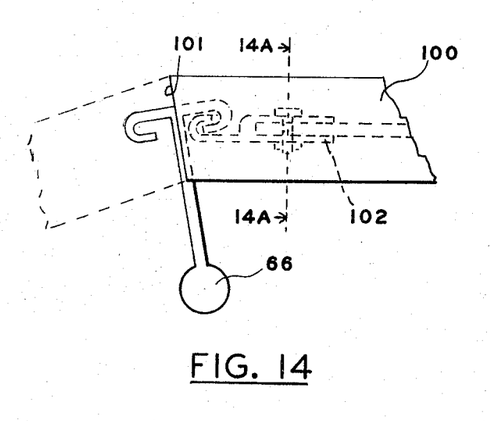
FIG. 14 is an enlarged fragmentary plan view showing a method of construction and assembly of the upper retaining railing.
Figure 14A:
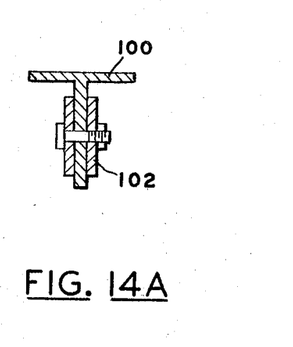
FIG. 14A is a sectional view on the line 14A—14A of FIG. 14.

In this preferred embodiment the outer posts 66 are continued upwardly for a preselected distance above the platform member. This additional distance provides support for a fence and railing. Shown in FIGS. 14 and 14A is a manner of joining a top railing 100 to the outer post 66. Railing 100 is made from a T-section extrusion with each end having a beveled cut end 101 to provide a miter-joint. The stem of the T is removed for a short distance from each end 101 so that a hook 102 may be riveted or otherwise attached to the stem of the T. Hook member 102 has a half-loop adapted to engage and firmly seat in the half-loop 62 of the outer post 66. The stem of the T of railing 100 may have a series of holes punched in the extent between hook ends 102 and to and through these holes may be attached the fence 42 of FIG. 2.

*Assembly*

Assembly of the preferred embodiment as described above and as seen in FIG. 13 includes forming a level surface 104 in the dirt and spreading a small amount of sand above the surface 104. The templet ring 34 is then bolted together using base bars 44, base plates 46 and cap screws 50. The inside posts 60 and the outer posts 66 are bolted to base plates 46 and the inner panels 92 and outer panels 96 are slid into place in the half-loops 62 of the posts. The platform members 70 are now bolted in place by means of U-bolts 78 and 86 and nuts 84. Sand is added to the base previously formed and this sand is placed over the templet ring 34 and against inner panels 92 so as to provide a smooth fillet corner (see FIG. 13). Dirt is placed against the outer wall including outer panel 96 and the depth of dirt is merely a matter of owner selection. To provide a water retaining surface on the inside of the pool, a plastic liner 38 (FIGS. 2 and 12) is placed on the sand and is brought to the inner wall 30 and laid against panels 92. The upper edge of the liner is brought up to the deck 36 which has a half-round edge 105 added to the front edge of the deck planks so that a smooth surface is presented to the plastic liner. A similar half-round retainer 106 is placed on the liner, the retainer and liner are then nailed or screwed to the deck 36. In the absence of a plastic liner, the sand can be mixed with one of many water-proof compounds to form a water-proof floor and the wall 30 can be sprayed with plastic at the joining of the panels 92 to the posts 60 so that a water-proof wall is provided.

Figure 1:
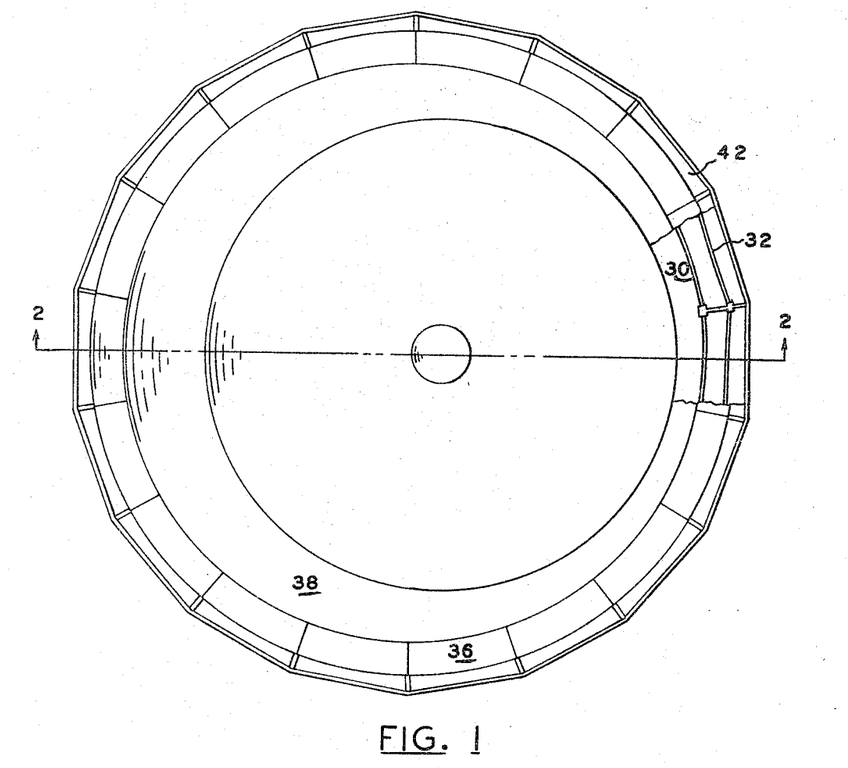
FIG. 1 is a plan view of a swimming pool assembly of this invention.
Figure 2:
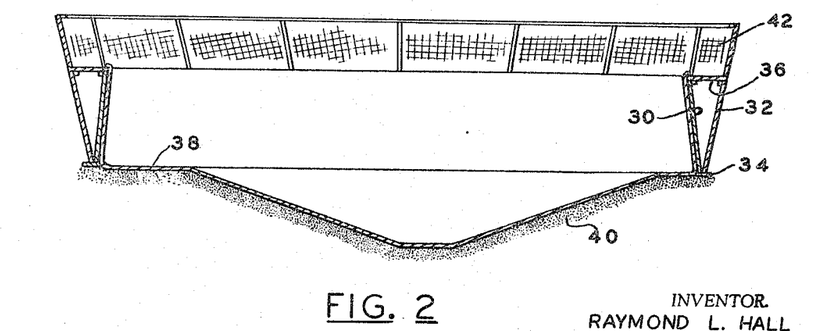
FIG. 2 is a sectional view on the line 2—2 of the pool of FIG. 1.

It is to be noted that the above construction provides for a pool whose inner panels 92 are bowed outwardly to form a circle of panels. The upper portion of connected panels form a circle of less diameter than does the circle formed of the lower portion of panels. The outer panels 96 when connected at posts 66 form a generally circular shape, however each individual panel 96 is bowed inwardly as seen in FIG. 1. This bowing is to accommodate the thrust or pressure of the dirt laying against the panel. As exemplified, the central portions of the inner and outer panels approach each other but do not touch. This space between panels importantly provides for expansion and contraction caused by the heating and cooling brought about by wide temperature variations. Dirt brought directly against the outer surface of the inner panel 92 would become rather rigid, particularly as to its ability to expand outwardly. A freezing temperature sufficient to cause the formation of a heavy ice layer in the pool would result in an outward thrust against the panel 92 and if this panel were immobilized by packed dirt the force of the ice against the plastic liner would likely cause severe damage to this liner. In the present embodiment this expansion is easily accommodated by the elasticity of the panels 92 and the hook joint of the side edges 95 and the half-loop 62 of the inside post 60. In a similar manner the heave of the dirt encountered with frost and freezing is easily accommodated by the outer wall 32 formed of outer panels 96 and outer posts 66.

Alternate forms of construction providing for inner and outer walls such as described above are possible. Alternate deck construction is, of course, both practical and feasible. Described below are two alternate forms of construction as well as two alternate deck constructions each alternate embodiment encompassing the spirit of this invention.

Figure 13:
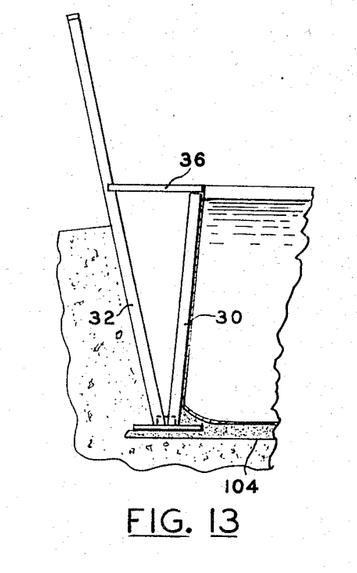
FIG. 13 is a fragmentary sectional view showing in enlarged detail the installed pool with water therein.
Figures 20, 21, 22:
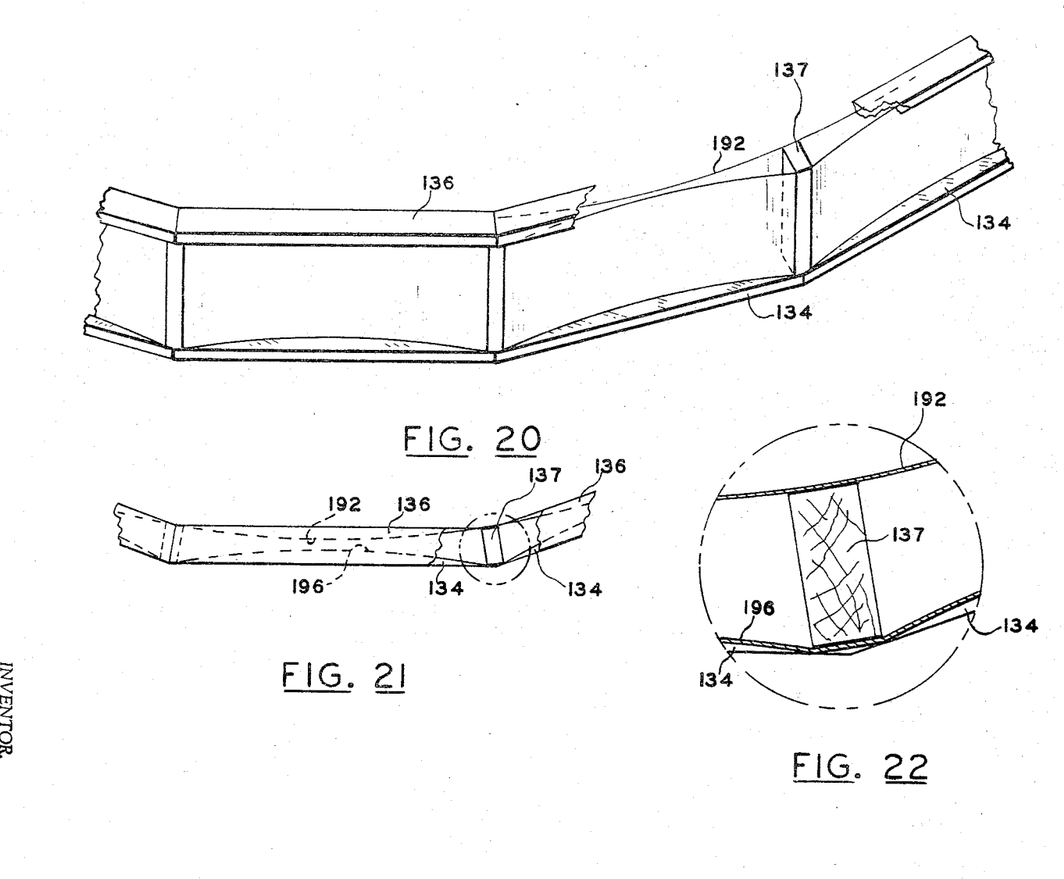
FIG. 20 is a fragmentary isometric view of an alternate form of pool construction.
FIG. 21 is a fragmentary plan view of the alternate form of FIG. 20.
FIG. 22 is an enlarged plan view of the vertical fabrication of the units comprising a frame assembly of FIG. 20.

FIGS. 20, 21 and 22 illustrate a novel construction in which both inner and outer walls are made of a continuous sheet of material, preferably metal. A base templet ring 134 may be made from equal lengths of two by eight structural lumber. These pieces of lumber have their ends mitered so as to permit the pieces to be joined in forming a polygon of, for example, twenty-four equal sides. A top templet 136 similar in size and construction to the bottom templet 134 is disposed a fixed distance above this bottom templet. This top templet 136 provides a deck surface similar to deck 36. An upright 137 disposed between the base templets 134 and top templet 136 is also preferably made of a two by eight and provides a truss member to which the various members making up the base and top templets can be fixedly attached. An inner wall which may be a strip of metal 192 is attached to the inner edge of upright 137 while a similar outer wall which also may be a strip of metal 196 is attached to the outer edge of the upright 137. A liner 38 as in FIG. 1 may be attached to the top templet 136 and laid against the inner wall 196 and on a smoothed ground 40. Sand as in FIG. 13 is also used to form a cove corner between the bottom and the inner wall which sand also anchors the bottom templet.

Figure 23:
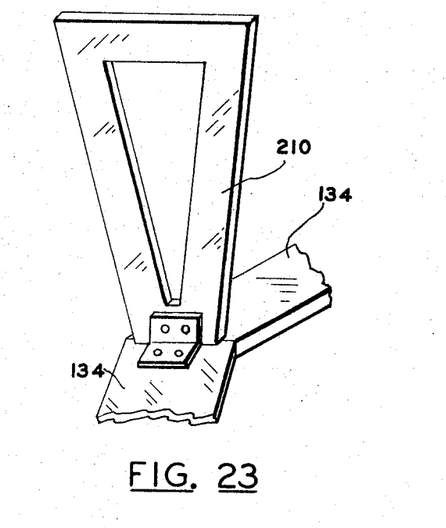
FIG. 23 is an isometric view of an alternate embodiment of a truss support frame.

Shown in FIG. 23 is a further embodiment showing a vertical truss 210 which may be attached to a base templet 134. A deck 36 or similar deck can be attached to the top surface of truss 210 and after assembly, an inner wall 192 and outer wall 196 may be made of a strip of metal or sheets of metal. A plastic liner 38 similar to FIG. 1 is also applicable to this assembly.

Figure 15:
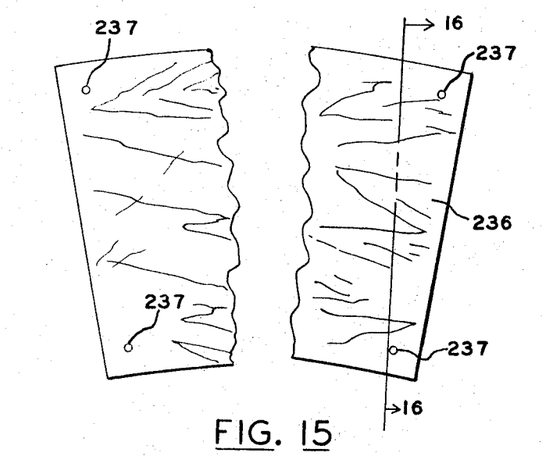
FIG. 15 is a plan view of an alternate embodiment showing a deck walkway member probably of plywood.
Figure 16:
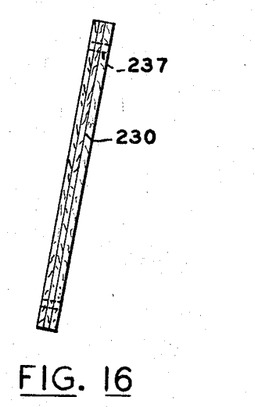
FIG. 16 is a sectional view on the line 16—16 of the deck member of FIG. 15.

Shown in FIGS. 15 and 16 is a deck 236 which may be made of plywood sawn to shape and preferably of three-quarters inch thickness. Holes 237 are made in this deck 236 and provide attaching means by the use of U-bolts 78 and 86 and nuts 84. The assembly for this embodiment is the same as described in conjunction with FIGS. 3, 4 and 5 however with a solid plywood deck the front beam 72 and the rear beam 74 can be eliminated.

Figures 17, 18:
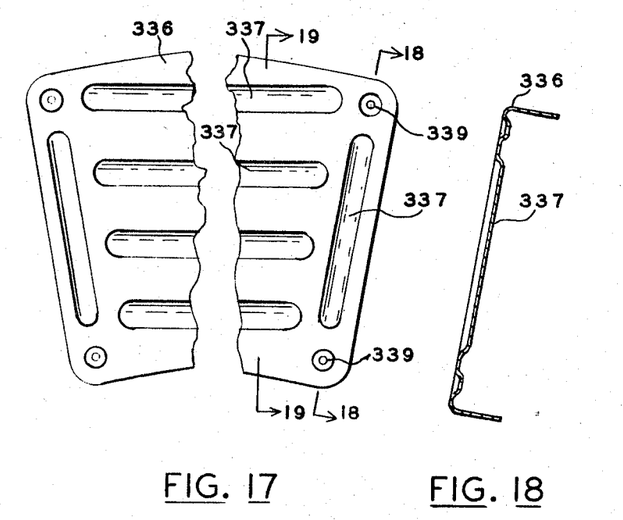
FIG. 17 is a further alternate embodiment of a deck walkway member of stamped metal construction.
FIG. 18 is a sectional view on the line 18—18 of the deck member of FIG. 17.
Figure 19:
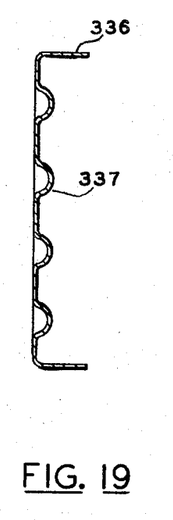
FIG. 19 is a sectional view on the line 19—19 of the deck member of FIG. 17.

Shown in FIGS. 17, 18 and 19 is still another alternate of deck construction in which a metal stamping 336 of perhaps one-sixteenth inch thick aluminum is sheared to shape. This stamping both for rigidity and to provide a non-skid surface has grooves 337 embossed in the plate, while holes 339 are formed in dimpled areas in the surface. These holes are adapted to receive U-bolts 78 and 86 with the dimpled area being sufficiently below the general plane of the deck so that nuts 84 when mounted on and tightened on the U-bolts will be substantially below the surface of deck 336.

It is to be seen in the foregoing description that the invention provides for a swimming pool which may be assembled so as to be installed in the ground an amount sufficient for the water level to be at ground level. At the other extreme of depth, the pool may be assembled so as to be all above ground level. This pool can be assembled with the minimum of skill and tools and it is contemplated that the pool when so assembled may be considered a permanent installation. When it is necessary or desirable to disassemble and move the pool it can be readily accomplished and the pool reassembled when and where desired. This pool provides an inner wall that can expand with the freezing action of water and provides a separate outer wall adapted to accommodate the heaving and shifting of dirt when subject to frost or freezing. This pool also provides a templet base in which portions of base bars extend under the water portion so that the weight of the water in the pool and resting on the bars assists in holding the pool in place.

It is to be noted that the terms "in" and "out," "top" and "bottom," "up" and "down" and similar terms are applicable to the apparatus as described in conjunction with the accompanying drawings and that such terms are merely for the purpose of description and do not necessarily apply to a position in which the apparatus may be constructed or used.

The invention in its broader aspects is not limited to the specific combinations shown and described but departures may be made therefrom within the scope of the accompanying claims, without departing from the principles of the invention and without sacrificing its chief advantages.

What is claimed is:

1. An above ground structure for swimming pools and the like and adaptable for prefabricated construction and comprising: (1) a base frame; (2) a plurality of base plates attached to the base frame; (3) an inside post member attached to and extending upwardly from each base plate; (4) an outside post member attached to and extending upwardly from each base plate; (5) a plurality of platform members each attached to adjacent pairs of inside and outside post members and at a predetermined distance above the base frame; (6) an inside panel attached to and extending from adjacent inside post members and from the base frame to the platform; (7) an outside panel attached to and extending from adjacent outside post members and from the base frame to a preselected point which is at least the ground level; and (8) a water retaining means extending around the perimeter formed by the plurality of platform members and simultaneously extending downwardly to the base frame and on the floor surface formed within the base frame.

2. A structure as in claim 1 in which the base frame is formed from a plurality of assembled base straps.

3. A structure as in claim 1 in which the inside and outside post members are provided with longitudinal engaging means and in which the inside and outside panels have their upright edges formed with means to seat and engage the longitudinal engaging means in the post members.

4. An above ground structure for swimming pools and the like and adaptable for prefabricated construction and comprising: (1) a base templet ring formed of a plurality of structure members connected at their ends; (2) a plurality of truss members attached to and extending upwardly from the base templet at preselected intervals; (3) a top templet ring formed of a plurality of structural members, said ring attached to the truss members; (4) an inside wall attached to and carried by the truss members; (5) an outer wall attached to and carried by the truss members, the inner and outer wall assembled to the truss members in spaced relationship; and (6) a water retaining means extending around the perimeter formed by the inner wall and the floor surface within the inner wall.

5. A structure as in claim 4 in which the water retaining means is a plastic liner.

6. A structure as in claim 5 in which the truss members includes outside post members extending above the top templet ring and a fence attachable to the outside post members.

7. A structure as in claim 6 in which the structural members of the top templet ring is formed of stamped metal plates.

8. An above ground structure for swimming pools and the like and adaptable for prefabricated construction, the pool having portions of its frame lying below the water containing portion and comprising: (1) a base frame formed of a plurality of assembled members a portion of each member disposed below the water containing pool portion; (2) a plurality of base plate attached to the base frame and forming a part thereof; (3) an inside post member attached to and extending upwardly from each base plate; (4) an outside post member attached to and extending upwardly from each base plate; (5) a plurality of platform members each removably attached to adjacent pairs of inside and outside post members and at a predetermined distance above the base frame; (6) a plurality of inside panels each removably attached to and extending from adjacent inside post members and from the base frame to the platform; (7) a plurality of outside panels each removably attached to adjacent outside post members and extending from the base frame to a preselected point which is at least the ground level; and (8) a plastic liner attached to and extending from the inside edge of the platform members thence downwardly over the base frame and over the floor inclosed by the base frame.

9. A structure as in claim 8 in which the inside and outside post members are provided with longitudinal engaging means and in which the inside and outside panels have their upright edges formed with means to seat and engage the longitudinal engaging means in said post members.

10. A structure as in claim 9 in which the inside post member is mounted at an angle so that the upper end is inward of the bottom base frame and the outer post member is mounted so that the upper end is outward of the bottom base frame, the outer post also extending a selected distance beyond the platform member providing in this extended portion means for attaching a fence.

11. In an above-ground structure for swimming pools and the like and adapted for prefabricated construction, the structure including a frame adapted to retain a water retaining means, said frame comprising; (1) a base templet ring formed from a plurality of members connected at their ends to form a polygon; (2) a plurality of inner post members of substantially the same length attached at one end to and extending upwardly from the base templet at preselected intervals; (3) a plurality of outer post members attached at one end to and extending upwardly and outwardly from the base templet at preselected intervals; and (4) a decking providing a truss and a walkway and comprising a plurality of members formed into an upper templet ring and attached to the inner and outer post members to provide said walkway substantially parallel to the bottom templet ring.

12. A structure as in claim 11 in which the upper templet ring includes an inner top templet ring formed from a plurality of members connected at their ends and to the top end of the inner post member to form a polygon substantially parallel to the base templet and an outer top templet ring formed from a plurality of members connected at their ends and to the outer post members at a determined distance from the base templet to position the top outer templet substantially in the same plane as the inner top templet.

13. A structure as in claim 12 in which a base plate is provided at the juncture of adjacent ends of the members of the base templet, the base plate further having means for attaching in a predetermined manner thereto of the ends of the base templet members and the lower end of an inner post member and an outer post member.

14. A structure as in claim 12 in which the upper end of the inner post and the adjacent ends of the inner top templet ring member are joined by means of a U-bolt in which an intermediate portion between the two leg portions is bent into two lengths connected by a straight portion, the two lengths and connected portion in a plane substantially at right angles to the leg portions of the U-bolt.

15. A structure as in claim 12 in which the outer post members are made of a length sufficient so that they extend above the outer top templet to provide support for a retaining rail, fence and the like.

16. A structure as in claim 12 in which the inner top templet is of less average diameter than the bottom templet ring and the outer top templet ring is of greater average diameter than the bottom templet ring.

References Cited by the Examiner

UNITED STATES PATENTS

| | | | |
|---|---|---|---|
| 2,944,264 | 7/1960 | Gagne et al. | 4—172 |
| 3,233,251 | 2/1966 | Barrera | 4—172 |
| 3,274,621 | 9/1966 | Diemond et al. | 4—172 |

LAVERNE D. GEIGER, *Primary Examiner.*

H. K. ARTIS, *Assistant Examiner.*